United States Patent [19]
Adey, Jr. et al.

[11] 3,756,382
[45] Sept. 4, 1973

[54] CONVEYOR SYSTEM

[75] Inventors: John S. Adey, Jr., New Vernon; John T. Collins, Chatham; Peter M. Cino, New Providence, all of N.J.

[73] Assignee: The Bucket Elevator Company, Chatham, N.J.

[22] Filed: July 30, 1971

[21] Appl. No.: 167,598

[52] U.S. Cl. ............................. 198/198, 198/184
[51] Int. Cl. ........................................... B65g 15/42
[58] Field of Search .................. 198/129, 193, 198, 198/201, 184

[56] References Cited
UNITED STATES PATENTS
| | | | |
|---|---|---|---|
| 810,510 | 1/1906 | Robins, Jr. | 198/198 |
| 874,982 | 12/1907 | Norton | 198/198 |

FOREIGN PATENTS OR APPLICATIONS
| | | | |
|---|---|---|---|
| 1,409,373 | 7/1965 | France | 198/201 |
| 836,620 | 4/1952 | Germany | 198/198 |
| 965,840 | 8/1964 | Great Britain | 198/201 |
| 1,065,772 | 9/1959 | Austria | 198/198 |

OTHER PUBLICATIONS

"Belt Permits 45° Angle Incline Conveyors," Coal Age, Sept. 1961, Page 121.

*Primary Examiner*—Richard E. Aegerter
*Assistant Examiner*—Joseph E. Valenza
*Attorney*—Harold L. Stults

[57] ABSTRACT

A conveyor system is disclosed having a conveyor belt with corrugated chevron or V-shaped cleats extending across the belt wherein the cleats provide pockets for retaining flowable materials during upward movement of the belt at a substantial angle to the horizontal. The apex of each cleat extends between the ends of the next cleat so as to provide continuous transverse overlapping of the cleats. The corrugations in the cleats permit the cleats to extend longitudinally of themselves so that they remain upright as they pass around the rollers upon which the belt is mounted. The cleats also have the very advantageous feature of permitting stable support of the conveyor belt during its return run by transverse rollers.

11 Claims, 5 Drawing Figures

PATENTED SEP 4 1973 3,756,382

INVENTORS
JOHN S. ADEY, JR.
JOHN T. COLLINS
PETER M. CINO
BY
Curtis, Morris & Safford
ATTORNEYS

CONVEYOR SYSTEM

This invention relates to conveyor systems, and more in particular to flexible belt conveyors in which the belt has evenly spaced V-shaped transverse corrugated cleats.

Endless conveyor belt systems have been provided for lifting flowable materials, such as solids in powder, granular and other bulk form. When the product-conveying run involves elevating the product, various means have been proposed to ensure that the product will not slide down as the conveyor belt carries it upwardly so that the product continues to move with the belt surface. Although some conveyors have been used for conveying many different products, each has its own limitations, particularly in respect to construction and operation.

It is an object of the present invention to provide improved conveyor systems of the above type. It is a further object to provide for the above with structures which are simple and sturdy and which are adaptable to wide ranges of operating conditions, construction and use. These and other objects will be in part obvious and in part pointed out below.

Figure 1:
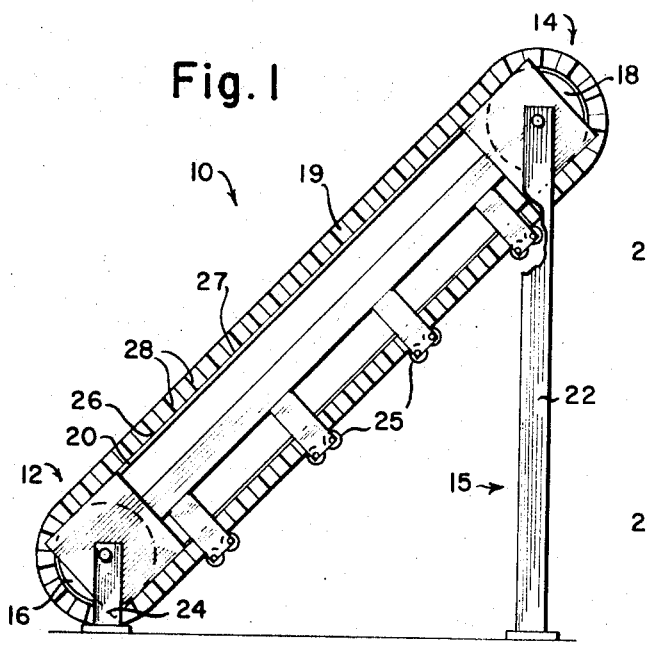
FIG. 1 is a simplified side elevation of an inclined conveyor constituting one embodiment of the invention.

Referring to FIG. 1 of the drawings, an inclined lifting or elevating conveyor 10 has a lower product receiving end 12 and an upper product discharging end 14. Conveyor 10 has a frame structure 15, end rollers 16 and 18, and a conveyor belt 19 mounted thereon. Frame structure 15 comprises a continuous longitudinal mounting structure 20 for belt 19, uprights 22 and 24, and a plurality of pairs of transverse rollers 25.

Belt 19 is made of an endless band and a continuous array of corrugated cleats 28. Band 26 is fabric reinforced rubber or other elastomer and has a product-conveying surface 27. Cleats 28 are of the "chevron" or open-V configuration, and are positioned upon and bonded to surface 27 or band 26.

The conveying run of belt 19 extends from the lower receiving end 12 to the upper discharging end 14, and the return run extends back down to end 12. In the conveying run, belt 19 moves from lower roller 16, upward and thence around upper roller 18, where it discharges the conveyed product. The belt then moves downwardly, supported by transverse rollers 25, to lower roller 16. The conveyor is powered by a motor (not shown) that turns roller 18 through a gear reduction unit and thus drives belt 19.

Figure 2:
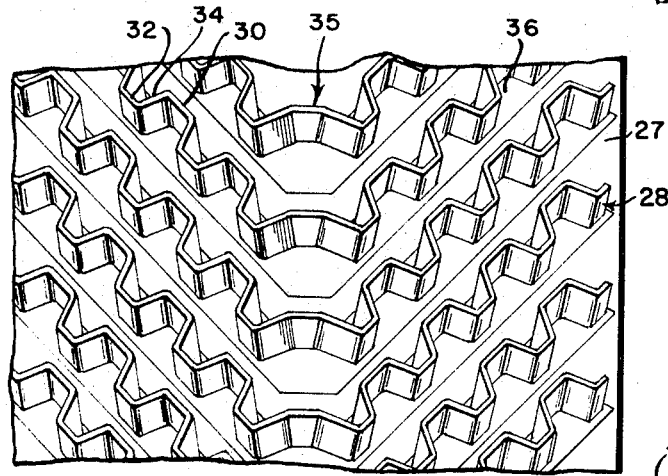
FIG. 2 is a perspective view of the top of the conveyor belt.

Referring now to FIG. 2, each corrugated cleat 28 comprises alternating sections 30 and 32, section 30 being an upright flat section, and section 32 being a pocket section with side walls 34 connected respectively to the adjacent sections 30 and a bottom or base section 36. As indicated above, each cleat 28 is attached to surface 27 of belt 19, and is of open-V or chevron configuration. The apex of each chevron is at the center line of the belt, pointing away from the direction of belt movement. Each of the arms of each chevron cleat extends at an angle of 45° from its apex and from its respective side edge of the conveyor, thus making the apex angle 90°, and the center line of belt 19 bisects the apex angle. A plurality of corrugated cleats 28 are attached to surface 27 of belt 19 at short intervals, making the belt appear as a series of closely spaced or nested chevron.

In the operation of the conveyor, a product is loaded at lower end 12, in sufficient quantity to substantially fill the cavities formed between cleats 28. The product is conveyed to upper end 14 where it is discharged as the belt passes around roller 18.

Figure 5:
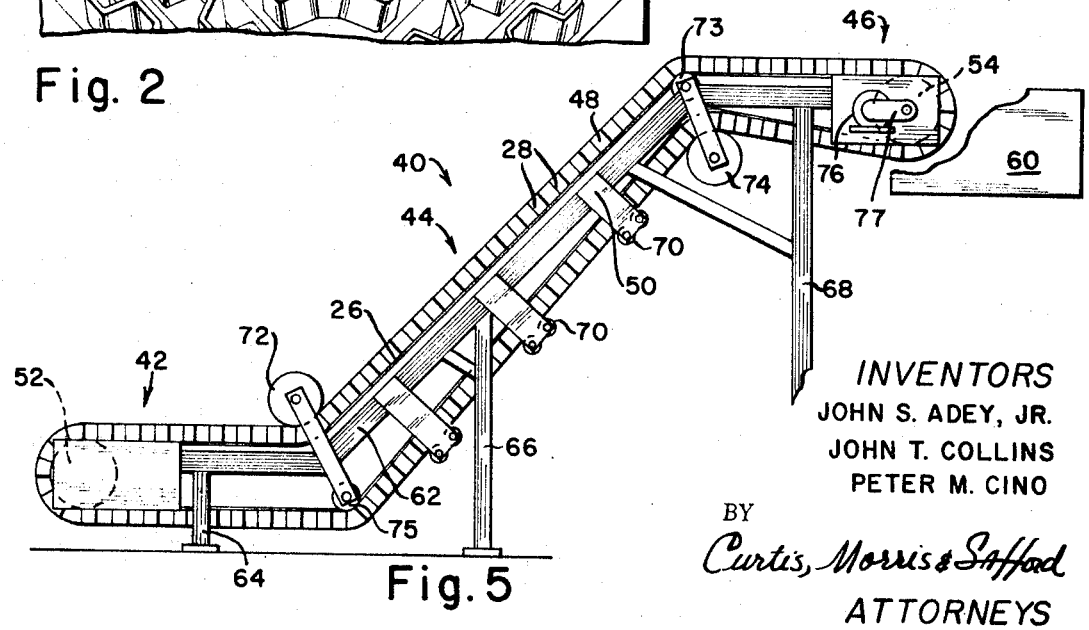
FIG. 5 is a view similar TO FIG. 1 and showing another embodiment of the invention.

Referring to FIG. 5, a conveyor 40 is similar to conveyor 10, but has a lower horizontal product-receiving section 42, an inclined lifting section 44, and an upper horizontal product-discharging section 46. The conveyor comprises a belt 48, a frame structure 50, end rollers 52 and 54 and a receiving station formed by a bin 60. Frame structure 50, similar to frame structure 15 of FIG. 1, comprises a continuous mounting structure 62 for belt 48, uprights 64, 66 and 68, and transverse rollers 70, 72 and 74. Belt 48, identical to belt 19 of FIG. 1 in all respect other than its length, comprises a continuous band 26 and an array of corrugated cleats 28.

The product conveying run for belt 48 extends from lower receiving station 42, upwardly along the upper side of lifting section 44 and over a roller 73, and thence horizontally to the discharge end at roller 54. In the product conveying run, belt 48 passes around lower roller 52 to station 42 where it receives the product and then proceeds horizontally along continuous mounting 62 until it reaches roller 72. Roller 72 contacts the upper edge of cleats 28 and allows belt 48 to change direction while it levels the conveyed product to the height of the top edge of the cleats. Leaving roller 72, belt 48 moves upwardly through lifting section 44 and passes around an inner roller 73 to the upper discharge section 46. Next, belt 48 passes around upper roller 54 and the conveyed product is discharged into receiving bin 60. Following discharge, belt 48 moves its return along the lower side of upper section 46, around roller 74, down the bottom side of lifting section 44 where it is supported by three pairs of transverse rollers 70, an inner roller 75 and then along the lower side of lower section 42 to pass again around lower roller 52. The conveyor is powered by a motor 76 that through a gear reduction unit 77 turns rollers 52 and thereby drives belt 48.

Figure 3:
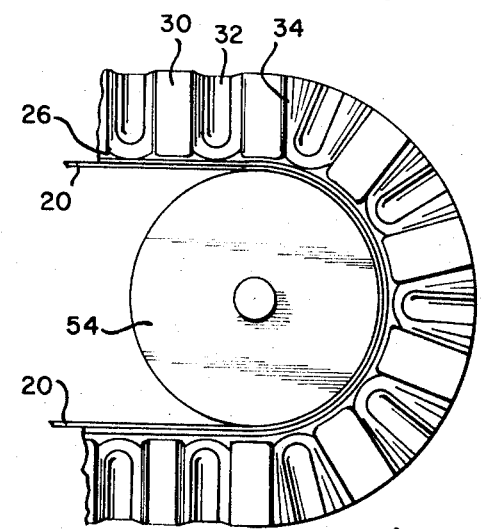
FIG. 3 is an enlarged side elevation of the product discharge end of the conveyor of FIG. 5 which has an inclined lifting section and a horizontal receiving and discharging section.
Figure 4:
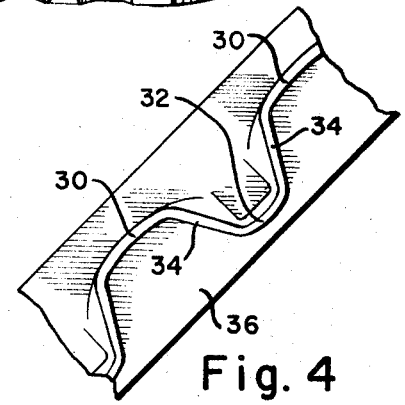
FIG. 4 is an enlarged view from the right of FIG. 5.

Referring to FIGS. 3 and 4, a portion of belt 48 is shown at upper roller 54. As the belt passes around roller 54, the top portion of the cleats remote from the roller, must elongate in order to remain upright, while portions close to the rollers are subject to little elongation. Band 26 is relatively thin, therefore, the bases of the cleats are subjected to little material distortions, whereas the cleats 28 are deep or high and thus their tops are subjected to relatively great distortions. As a particular cleat approaches roller 54, (FIG. 4) the end of each arm of the cleat starts to move downwardly around the roller whereupon each arm of the cleat forms a segment of a spiral. Each of the pocket sections 32 is sufficiently flexible to permit it to flex outwardly as shown in FIG. 4 while the flat sections 30 remain upright. Hence, each cleat retains its upright position even though its upper edge is elongated substantially. Also, the central portion 35 of each cleat 28 extends transversely of the belt so that it is not subjected to elongation. It should be noted that the central portion 35 is relatively small as illustrated but the invention contemplates that it may be of greater length.

Assume now that the product being conveyed is a granular material containing fine particles which tend to adhere to the belt surface. Also, assume that the entire center portion of the belt has been loaded to substantially the tops of the cleats so that the space or cavity between each cleat and the next is substantially filled with the product. As illustrated in FIG. 4, the stretching in the elongation of the cleat tends to dislodge the particles from the cleat surfaces. Also, the cleat is elongated progressively more toward its top so that each corrugation section 32 opens up at its top somewhat in the nature of one-half of a frustrum of a cone. That provides an even and smooth discharge of the product from the belt. The cleat walls are not placed under stress but are merely flexed, and the opposite side of each cleat are completely freed of the product. Also, the flexing of the cleats opens up the space between them so that the product falls away from the belt surface. As a cleat passes around a roller, it assumes its normal corrugated condition. As the belt continues over the return rollers, the upright cleats provide continuous support for the belt thus reducing sagging of the belt along the return run thereof.

I claim:

1. In a conveyor which is adapted to elevate flowable products from a receiving station to a discharge station, the combination of, a flexible endless belt, a plurality of rollers upon which said belt is mounted with a product conveying run extending from said product receiving station along an upwardly inclined path to and around a roller at said product discharge station, said conveyor belt presenting a product conveying surface upon which the product is deposited and supported during the conveying movement, and a continuous array of closely nested cleats mounted on said belt along said product conveying surface, said cleats having a generally chevron-shaped configuration in plan with each of said cleats having two leg portions which extend respectively from the opposite side edges of said product conveying surface and which converge to an apex in the opposite direction to that of the belt movement, said leg portions being interconnected at said apex along the central portion of said product conveying surface and comprising a continuous base portion bonded to said belt and an integral upstanding flexible wall which is corrugated longitudinally and has a total wall height which is sufficient to permit the wall to remain substantially upright from said product supporting surface when said belt passes around one of said rollers, said cleats being bonded to said product conveying surface with the base portions thereof positioned adjacent each other and the apex of each cleat being located between the ends of an adjacent cleat, adjacent the apex of said adjacent cleat, to define a continuous array of overlapping and nested cleats whereby each pair of adjacent cleats defines a pocket therebetween with said product conveying surface during the upwardly inclined movement of said product conveying surfaces, to retain said flowable product therebetween, and the corrugations in said corrugated longitudinal walls of each of said cleats opening by flexing as they pass over said roller at said discharge opening while remaining upright to completely discharge said flowable material from said pockets.

2. An apparatus as described in claim 1 wherein each of said cleats is substantially V-shaped in plan.

3. An apparatus as described in claim 1 wherein said belt is formed from a textile-reinforced elastomer and wherein said cleats are formed of elastomer bonded to said belt.

4. An apparatus as described in claim 2 wherein said belt has a return run substantially parallel to said product-conveying run, and a support roller for said conveyor run upon which said cleats are supported to thereby reduce the sag in said return run.

5. An apparatus as described in claim 4 wherein said product-conveying run extends from said inclined path along a horizontal portion to said discharge station.

6. An apparatus as described in claim 5 wherein said conveying run includes a horizontal portion at said product-receiving station.

7. An apparatus as described in claim 1 wherein each of said two leg portions comprises corrugation portions and interconnecting flat portions, each of said corrugation portions having a central wall which terminates in a bottom wall and two side walls each of which is integral with the respective adjacent flat portions.

8. An apparatus as described in claim 1 which includes product-receiving means at said discharge station.

9. An apparatus as described in claim 1 which includes a frame construction mounting said rollers.

10. An apparatus as described in claim 10 wherein there are two rollers upon which said belt is mounted supporting the product-conveying run along a single plane.

11. An apparatus as described in claim 10 which includes a horizontal product-receiving section and a horizontal section adjacent said discharge station, and wherein said rollers include rollers at the ends of the product-conveying run and additional rollers above the respective two runs of said belt at the bottom of said inclined path and a pair of rollers below the respective runs at the top of said inclined path.

* * * * *